United States Patent
Flynn et al.

(10) Patent No.: US 9,252,965 B2
(45) Date of Patent: *Feb. 2, 2016

(54) DIRECTED ROUTE LOAD/STORE PACKETS FOR DISTRIBUTED SWITCH INITIALIZATION

(71) Applicant: International Business Machines Corporation, Armonk, NY (US)

(72) Inventors: William T. Flynn, Rochester, MN (US); Joseph A. Kirscht, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/836,484

(22) Filed: Mar. 15, 2013

(65) Prior Publication Data
US 2014/0269693 A1    Sep. 18, 2014

Related U.S. Application Data

(63) Continuation of application No. 13/835,220, filed on Mar. 15, 2013.

(51) Int. Cl.
*H04L 12/28* (2006.01)
*H04L 12/721* (2013.01)
(Continued)

(52) U.S. Cl.
CPC .............. *H04L 12/28* (2013.01); *H04L 12/66* (2013.01); *H04L 41/0896* (2013.01);
(Continued)

(58) Field of Classification Search
CPC ....... H04L 45/20; H04L 45/566; H04L 45/74; H04L 45/44; H04L 12/28; H04L 12/66; H04L 41/0896; H04L 45/04; H04L 45/34

USPC ........................................... 370/401, 254, 389
See application file for complete search history.

(56) References Cited

U.S. PATENT DOCUMENTS 4,631,534 A    12/1986  Franklin et al.
5,134,610 A *  7/1992  Shand et al. .................. 370/400
(Continued)

FOREIGN PATENT DOCUMENTS

JP    03273727 A    12/1991
JP    11341060 A    12/1999
JP    2011166692 A   8/2011

OTHER PUBLICATIONS

U.S. Appl. No. 13/628,530 entitled "Fencing Off Switch Domains," filed Sep. 27, 2012 by David R. Engebretsen et al.
(Continued)

*Primary Examiner* — Edan Orgad
*Assistant Examiner* — Emmanuel Maglo
(74) *Attorney, Agent, or Firm* — Patterson & Sheridan, LLP

(57) ABSTRACT

Techniques for transmitting a packet from a source switch module to a destination switch module. Embodiments receive, at a first port of a first switch module, a packet that includes (i) path information specifying a route to the destination switch module and (ii) a set of load/store operations to be executed by the destination switch module. An indication of the first port is inserted into a return path information portion of the received packet. Upon determining that the first switch module is not the destination switch module, embodiments transmit the packet to a second switch module using a second port, the second port specified in the path information of the received packet, wherein the destination switch module is configured, upon receiving the packet, to copy the set of load/store operations into an execution buffer to be automatically executed.

24 Claims, 11 Drawing Sheets

(51) Int. Cl.
  *H04L 12/733* (2013.01)
  *H04L 12/741* (2013.01)
  *H04L 12/947* (2013.01)
  *H04L 29/06* (2006.01)
  *H04L 12/66* (2006.01)
  *H04L 12/715* (2013.01)
  *H04L 12/931* (2013.01)
  *H04L 12/24* (2006.01)

(52) U.S. Cl.
  CPC .............. *H04L 45/04* (2013.01); *H04L 45/20* (2013.01); *H04L 45/34* (2013.01); *H04L 45/44* (2013.01); *H04L 45/566* (2013.01); *H04L 45/74* (2013.01); *H04L 49/252* (2013.01); *H04L 49/35* (2013.01); *H04L 69/22* (2013.01)

(56) References Cited

U.S. PATENT DOCUMENTS

| | | | |
|---|---|---|---|
| 5,237,565 A * | 8/1993 | Henrion | H04L 12/5601 340/2.27 |
| 5,608,720 A * | 3/1997 | Biegel et al. | 370/249 |
| 6,081,506 A * | 6/2000 | Buyukkoc | H04L 12/5602 370/235 |
| 6,185,214 B1 | 2/2001 | Schwartz et al. | |
| 6,198,747 B1 * | 3/2001 | Bingham et al. | 370/401 |
| 6,246,680 B1 | 6/2001 | Muller et al. | |
| 6,331,983 B1 * | 12/2001 | Haggerty et al. | 370/400 |
| 6,487,177 B1 * | 11/2002 | Weston-Dawkes | 370/254 |
| 6,618,373 B1 | 9/2003 | Subramaniam | |
| 6,697,359 B1 | 2/2004 | George | |
| 6,934,283 B1 | 8/2005 | Warner | |
| 7,046,668 B2 | 5/2006 | Pettey et al. | |
| 7,093,027 B1 | 8/2006 | Shabtay et al. | |
| 7,188,209 B2 | 3/2007 | Pettey et al. | |
| 7,219,183 B2 | 5/2007 | Pettey et al. | |
| 7,221,676 B2 * | 5/2007 | Green | H04L 12/4641 370/392 |
| 7,372,843 B1 * | 5/2008 | Asawa et al. | 370/349 |
| 7,457,906 B2 | 11/2008 | Pettey et al. | |
| 7,461,130 B1 | 12/2008 | AbdelAziz et al. | |
| 7,477,657 B1 * | 1/2009 | Murphy | H04L 41/5022 370/351 |
| 7,525,968 B1 | 4/2009 | Dropps et al. | |
| 7,613,816 B1 | 11/2009 | Dropps et al. | |
| 7,746,872 B2 | 6/2010 | Norden | |
| 7,774,440 B1 * | 8/2010 | Bagrodia et al. | 709/221 |
| 7,788,522 B1 | 8/2010 | Abdelaziz et al. | |
| 8,149,834 B1 | 4/2012 | Nielsen et al. | |
| 8,194,534 B2 | 6/2012 | Pandey et al. | |
| 8,396,022 B1 * | 3/2013 | Lindsay et al. | 370/321 |
| 8,842,523 B2 | 9/2014 | Engebretsen et al. | |
| 8,848,517 B2 | 9/2014 | Engebretsen et al. | |
| 2001/0019554 A1 | 9/2001 | Nomura et al. | |
| 2001/0050915 A1 | 12/2001 | O'Hare et al. | |
| 2002/0013847 A1 * | 1/2002 | Fisher et al. | 709/226 |
| 2002/0067731 A1 | 6/2002 | Houston et al. | |
| 2003/0120715 A1 | 6/2003 | Johnson et al. | |
| 2003/0204273 A1 | 10/2003 | Dinker et al. | |
| 2004/0028038 A1 | 2/2004 | Anderson et al. | |
| 2004/0260842 A1 * | 12/2004 | Pettey | G06F 13/4022 710/1 |
| 2005/0094568 A1 * | 5/2005 | Judd | 370/242 |
| 2005/0102437 A1 * | 5/2005 | Pettey | G06F 13/4022 710/1 |
| 2005/0147117 A1 * | 7/2005 | Pettey | H04L 49/356 370/463 |
| 2005/0268137 A1 * | 12/2005 | Pettey | H04L 12/4641 713/400 |
| 2006/0002304 A1 * | 1/2006 | Ashwood-Smith | 370/238 |
| 2006/0077974 A1 | 4/2006 | Goossens et al. | |
| 2006/0198356 A1 | 9/2006 | Mayernick | |
| 2007/0115964 A1 | 5/2007 | Srinivasan et al. | |
| 2007/0297406 A1 | 12/2007 | Rooholamini | |
| 2008/0126649 A1 | 5/2008 | George | |
| 2008/0148010 A1 | 6/2008 | Kodama | |
| 2008/0285562 A1 * | 11/2008 | Scott et al. | 370/392 |
| 2009/0109967 A1 | 4/2009 | Banerjee et al. | |
| 2009/0265449 A1 | 10/2009 | Krishnappa et al. | |
| 2009/0285128 A1 | 11/2009 | Swan | |
| 2010/0095020 A1 | 4/2010 | Rixner et al. | |
| 2011/0085557 A1 | 4/2011 | Gnanasekaran et al. | |
| 2011/0090804 A1 | 4/2011 | Wusirika | |
| 2011/0222534 A1 | 9/2011 | Kurita | |
| 2011/0273980 A1 | 11/2011 | Ashwood Smith | |
| 2011/0286326 A1 | 11/2011 | Awano | |
| 2011/0289344 A1 | 11/2011 | Bae et al. | |
| 2012/0044944 A1 * | 2/2012 | Kotha | H04L 45/66 370/401 |
| 2012/0051232 A1 | 3/2012 | Nomura | |
| 2012/0099602 A1 * | 4/2012 | Nagapudi et al. | 370/401 |
| 2012/0143892 A1 | 6/2012 | Fried et al. | |
| 2012/0188865 A1 | 7/2012 | Michaelis et al. | |
| 2014/0003249 A1 | 1/2014 | Cai | |
| 2014/0086044 A1 | 3/2014 | Engebretsen et al. | |
| 2014/0086051 A1 | 3/2014 | Engebretsen et al. | |
| 2014/0229602 A1 | 8/2014 | Engebretsen et al. | |
| 2014/0233566 A1 | 8/2014 | Flynn et al. | |
| 2014/0233578 A1 | 8/2014 | Flynn et al. | |
| 2014/0233579 A1 | 8/2014 | Flynn et al. | |
| 2014/0269692 A1 | 9/2014 | Flynn et al. | |
| 2014/0269694 A1 | 9/2014 | Flynn et al. | |
| 2015/0103833 A1 | 4/2015 | Flynn et al. | |
| 2015/0103834 A1 | 4/2015 | Flynn et al. | |

OTHER PUBLICATIONS

U.S. Appl. No. 13/762,605 entitled "Management of Node Membership in a Distributed System," filed Feb. 8, 2013 by David R. Engebretsen et al.

U.S. Appl. No. 14/572,441, entitled "Directed Route Load/Store Packets for Distributed Switch Initialization", filed Dec. 16, 2014.

U.S. Appl. No. 14/572,480, entitled "Directed Route Load/Store Packets for Distributed Switch Initialization", filed Dec. 16, 2014.

U.S. Appl. No. 14/572,507, entitled "Directed Route Load/Store Packets for Distributed Switch Initialization", filed Dec. 16, 2014.

* cited by examiner

US 9,252,965 B2

DIRECTED ROUTE LOAD/STORE PACKETS FOR DISTRIBUTED SWITCH INITIALIZATION

CROSS-REFERENCE TO RELATED APPLICATIONS

This application is a continuation of co-pending U.S. patent application entitled "DIRECTED ROUTE LOAD/STORE PACKETS FOR DISTRIBUTED SWITCH INITIALIZATION", Ser. No. 13/835,220, filed Mar. 15, 2013. The aforementioned related patent application is herein incorporated by reference in its entirety.

BACKGROUND

The present invention relates to computer networking, and more specifically, to techniques for transmitting a bidirectional message within a distributed switch module.

Computer systems often use multiple computers that are coupled together in a common chassis. The computers may be separate servers that are coupled by a common backbone within the chassis. Each server may be a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

Additionally, the switch itself may be a distributed system. For example, the distributed switch may include a plurality of switch modules and one or more control modules. Generally, the switch modules may each include a respective set of ports and could be configured to act as independent sub-switches. The control module(s) could provide control plane logic for the plurality of switch modules, and the control module(s) may be shared by the plurality of switch modules. One advantage to such a distributed switch is that distributed systems can oftentimes grow larger than conventional systems at less cost. Additionally, distributed systems are frequently more modular then conventional systems, allowing faulty, individual components to be isolated and replaced in a more efficient and inexpensive fashion.

SUMMARY

Embodiments provide a method, computer-readable storage medium and system for transmitting a packet from a source switch module to a destination switch module. The method, computer-readable storage medium and system include receiving, at a first port of a first switch module, a packet that includes (i) path information specifying a route to the destination switch module and (ii) a set of load/store operations to be executed by the destination switch module. The method, computer-readable storage medium and system also include inserting an indication of the first port into a return path information portion of the received packet. Additionally, the method, computer-readable storage medium and system include, upon determining that the first switch module is not the destination switch module, transmitting the packet to a second switch module using a second port, the second port specified in the path information of the received packet, wherein the destination switch module is configured, upon receiving the packet, to copy the set of load/store operations into an execution buffer to be automatically executed.

DETAILED DESCRIPTION

Figure 1:
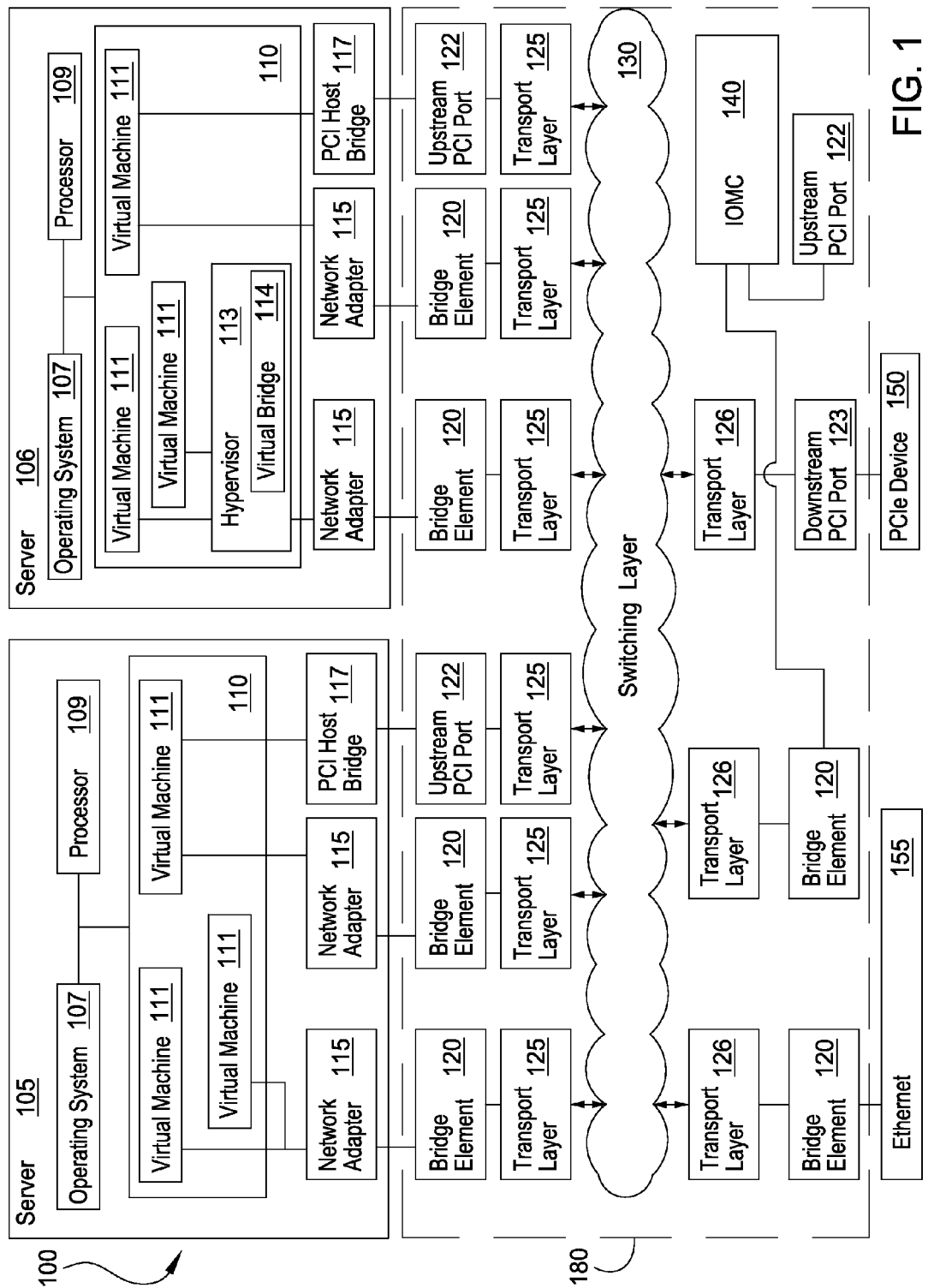
FIG. 1 illustrates a system architecture that includes a distributed, virtual switch, according to one embodiment described herein.

Generally, a distributed, virtual switch may include a plurality of switch modules, each of which contains a set of ports and logic to direct traffic between the ports. The distributed switch may also include one or more control modules (also referred to herein as a "switch management controller"), which provide control plane logic for the plurality of switch modules and are shared by the plurality of switch modules. Doing so can allow distributed switches to scale to larger sizes for less cost than conventional switches.

In some circumstances, it may be desirable for a controller to direct the actions of individual switch modules within a distributed switch. As an example, a controller could direct a switch module's actions in order to configure the communication links of the switch module. However, before the links of the switch module within the distributed switch are configured, the controller may be unable to communicate with the switch module using Ethernet communications. In such a situation, an administrator may be required to directly connect to the switch module in order to configure the links of the switch module manually.

As such, embodiments provide techniques for transmitting a management packet from a source switch module to a destination switch module. Here, a payload of the management packet may include a set of load/store operations which are to be executed by the destination switch module. For example, a controller could transmit a management packet to a particular switch module within the distributed switch, which contains a set of load/store operations which, when executed, are configured to configure the links of the switch module. Generally, the controller and the switch modules can be configured to transmit the packet using switch-to-switch communications links between the switches. For example, the packet could be transmitted using inter-switch communication links that are also used for transmitting Ethernet traffic within the distributed switch, but could be transmitted using a communications model that is separate and distinct from the Open Systems Interconnection (OSI) model. This allows embodiments to communicate within the distributed switch, before OSI communications (e.g., logic on a switch module to process layer 2 network traffic) are active.

The controller could retrieve path information specifying a route from the controller through the distributed switch to the destination switch module. The controller could then create a packet that includes at least a portion of the path information. For example, the packet could include a list of link IDs that are used to transmit the packet from the controller to the destination switch module. As an example, the created packet could contain the ports "5, 2, 3", indicating that the controller will transmit the packet to a first switch module using the controller's link with link ID "5", the first switch module will transmit the packet to a second switch module using the first switch module's link with link ID "2", and the second switch module will transmit the packet to the destination switch module using the second switch module's link with link ID "3". In one embodiment, the created packet does not contain a link ID associated with the path between the controller and the second switch module. For example, the controller could be configured to insert the packet into a buffer within the second switch module using PCIe communications, the buffer associated with a directed route load store (DRLS) component (discussed in more detail below).

Additionally, the created packet could contain a set of load/store operations to be executed by the destination switch module. As discussed above, the set of load/store operations could be a set of operations which, when executed, are configured to configure the Ethernet communication links of the destination switch module. The created packet is then transmit to another switch module within the distributed switch. Here, the packet could be transmitted using a link on the controller unit that is determined based on the retrieved path information. For example, the path information could specify that the packet should be transmitted using the controller's link having link ID "5".

The packet could then be received by an intermediary switch module within the distributed switch. Generally, an "intermediary switch module" refers to any switch module within the distributed switch along a particular path between a source (e.g., the controller) and a destination switch module. Upon receiving the packet, logic on the intermediary switch module could determine an identifier (e.g., a link ID) of the link of the intermediary switch module on which the packet was received. The logic could then insert the determined identifier into the packet, for use in transmitting an acknowledgement message back to the source (e.g., the controller) once the set of load/store operations have been executed by the destination switch module.

For instance, as the packet passes through the intermediary switch module(s) towards the destination switch module, each intermediary switch module could insert a respective link identifier into the packet. Once the destination switch module has received the packet and executed the set of load/store operations, the packet could then be passed back through the intermediary switch modules to the source (e.g., the controller). Each intermediary switch module could then use the link identifier that the intermediary switch module previously inserted into the packet to select which link to transmit the packet on. Thus, for example, if an intermediary switch module initially received the packet on its link having a link ID of "3", the intermediary switch module could then transmit the acknowledgement message back to the source using the link having a link ID of "3".

Once the link identifier is inserted into the packet, the intermediary switch module accesses the path information within the packet that specifies the route to the destination switch module. The intermediary switch module could then use the path information to determine how to transmit the packet towards the destination switch module. For instance, the path information could include a list of link identifiers to be used in transmitting the packet to the destination switch module. As an example, assume that the packet contains path information specifying the link IDs "5, 2, 3". The intermediary switch module could then determine which of these links to use, and could then forward the packet on the corresponding link. For example, the path information could also include a switch ID field, which is incremented each time the packet is forwarded to a switch module. In such an embodiment, the switch ID field could be used as an index to the list of link IDs to determine which link the current switch module should use. For example, if the intermediary switch module determines the switch ID is "1", the intermediary switch module could use this value as in index to the set of link IDs and could determine that link "2" should be used to forward the packet on towards the destination switch module. The intermediary switch module could then transmit the packet on the determined link.

Generally speaking, the packet may go through any number of intermediary switch modules before ultimately reaching the destination switch module. The destination switch module, upon receiving the packet, could copy the set of load/store operations within the packet into an execution buffer on the destination switch module. The execution buffer generally refers to some area of memory on a switch module (or accessible by the switch module) that is configured to store one or more load/store operations for execution. For example, the execution buffer could be an array object on the switch module and logic on the switch module could be configured to monitor the array to determine when load/store operations are copied into the array for execution. Upon detecting one or more load/store operations within the array, the logic could automatically execute the load/store operations (e.g., in an order based on the order the load/store operations are stored in the array).

Once the load/store operations are executed, the destination switch module could transmit an acknowledgement message back to the source, using the link information inserted into the packet by the intermediary switch modules. In one embodiment, the packet itself is transmitted back to the source as the acknowledgement message. Upon receiving the acknowledgement message, the source could conclude that the packet was successfully received by the destination switch module and that the set of load/store operations within the packet were successfully executed by the destination switch module. Advantageously, doing so provides a technique through which a controller can transmit a set of load/store operations to any switch module within the switch fabric to direct the switch module's actions. Additionally, as the management packet can be transmitted over the Ethernet communication links (or more generally, using switch-to-switch communication links of any form within the distributed switch) between the switches using a separate communications format from OSI network communications, the controller can transmit such management packets regardless of the state of the switching logic for processing OSI network communications on the Ethernet communication links. This may be particularly advantageous, for instance, when OSI network communication over the Ethernet links between the switch modules are unavailable (e.g., when first configuring the logic to handle layer 2 traffic on the Ethernet communication links).

These techniques for transmitting a management packet to a remote switch module are discussed in more detail in Section II below. However, Section I first describes an exemplary environment in which embodiments may be implemented. Of note, while embodiments may be implemented in the distributed switch environment described in Section I, such an environment is provided for illustrative purpose only and without limitation. Moreover, it is broadly contemplated that embodiments may implemented in any switch or network environment, consistent with the functionality described herein.

I. Distributed Switch Infrastructure

A distributed, virtual switch may appear as a single switch element to a computing system (e.g., a server) connected to the distributed switch. In reality, the distributed switch may include a plurality of different switch modules that are interconnected via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). Moreover, each of the switch modules may be configured to accept and route data based on two different communication protocols. To the computing system, however, the two separate switch modules appear to be one single switch.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch. However, instead of simply using one egress connection interface to forward the copies of the data frame to each of the destinations sequentially, the sub-switch may use a plurality of connection interfaces to transfer copies of the data frame in parallel. For example, a sub-switch may have a plurality of Tx/Rx ports that are each associated with a connection interface that provides connectivity to the other sub-switches in the distributed switch. The port that receives the multicast data frame can borrow the connection interfaces (and associated hardware) assigned to these other ports to transmit copies of the multicast data frame in parallel.

In addition, these sub-switches may be arranged in a hierarchical structure where one or more sub-switches are selected to act as surrogates. The sub-switches of the distributed switch are grouped together where each group is assigned to one or more of the surrogates. When a sub-switch receives a multicast data frame, it forwards the packet to one of the surrogate sub-switches. Each surrogate sub-switch may then forward the packet to another surrogate or to a destination sub-switch. Because the surrogates may also transmit the packets in parallel using two or more connection interfaces, the bandwidth used to forward the multicast packet increases for each surrogate used.

Further, the surrogate hierarchy may be configured to be compatible with link aggregation where multiple physical connections are grouped together to create an aggregated (logical) link. Link aggregation requires similar data frames to use the same data path when traversing the distributed switch. With a unicast data frame, the sub-switch that receives the data frame typically identifies the destination port (based on a hash key) and forwards the data frame to the sub-switch with that port. However, with multicast data frames, it may be impossible to store information about every port in the distributed switch on each sub-switch. Instead, the sub-switch that receives the multicast data frame may not identify the destination port but instead forward the multicast data according to the hierarchy.

In one embodiment, the multicast data is forwarded to at least two sub-switches that each have at least one local port that belongs to the same aggregated link. Because the Link Aggregation Protocol permits only one of these local ports to be the selected port, each sub-switch performs link selection using the same hash value to determine if its local port is the selected port. If the local port is the selected port, the sub-switch transmits the multicast data frame using the selected port. If not, the sub-switch disregards the multicast data.

In another embodiment, only one port is enabled for each aggregated link in a multicast group. The multicast data traverses the surrogate hierarchy until it reaches the sub-switch with the enabled port. The sub-switch then performs link selection to determine which of the ports in the trunk is the selected port. If the selected port is the local enabled port on the sub-switch, then the sub-switch uses that port to transmit the multicast data. If not, the sub-switch determines which port in the aggregated link is the selected port and forwards the multicast data to the sub-switch that contains the selected port.

In another embodiment, link selection is never performed. Like in the previous embodiment, in this embodiment, only one port is enabled for each aggregated link in a multicast group. The multicast data traverses the surrogate hierarchy until it reaches the sub-switch with the enabled port. However, the sub-switch never uses the hash value to determine which of the ports in the aggregated link is the selected port. Instead, all the multicast traffic for that aggregated link in the MC group is transmitted through the enabled port rather than being dispersed across the different ports of the aggregated link based on the hash key.

FIG. 1 illustrates a system architecture that includes a distributed virtual switch, according to one embodiment described herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111. The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement of Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected to the PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
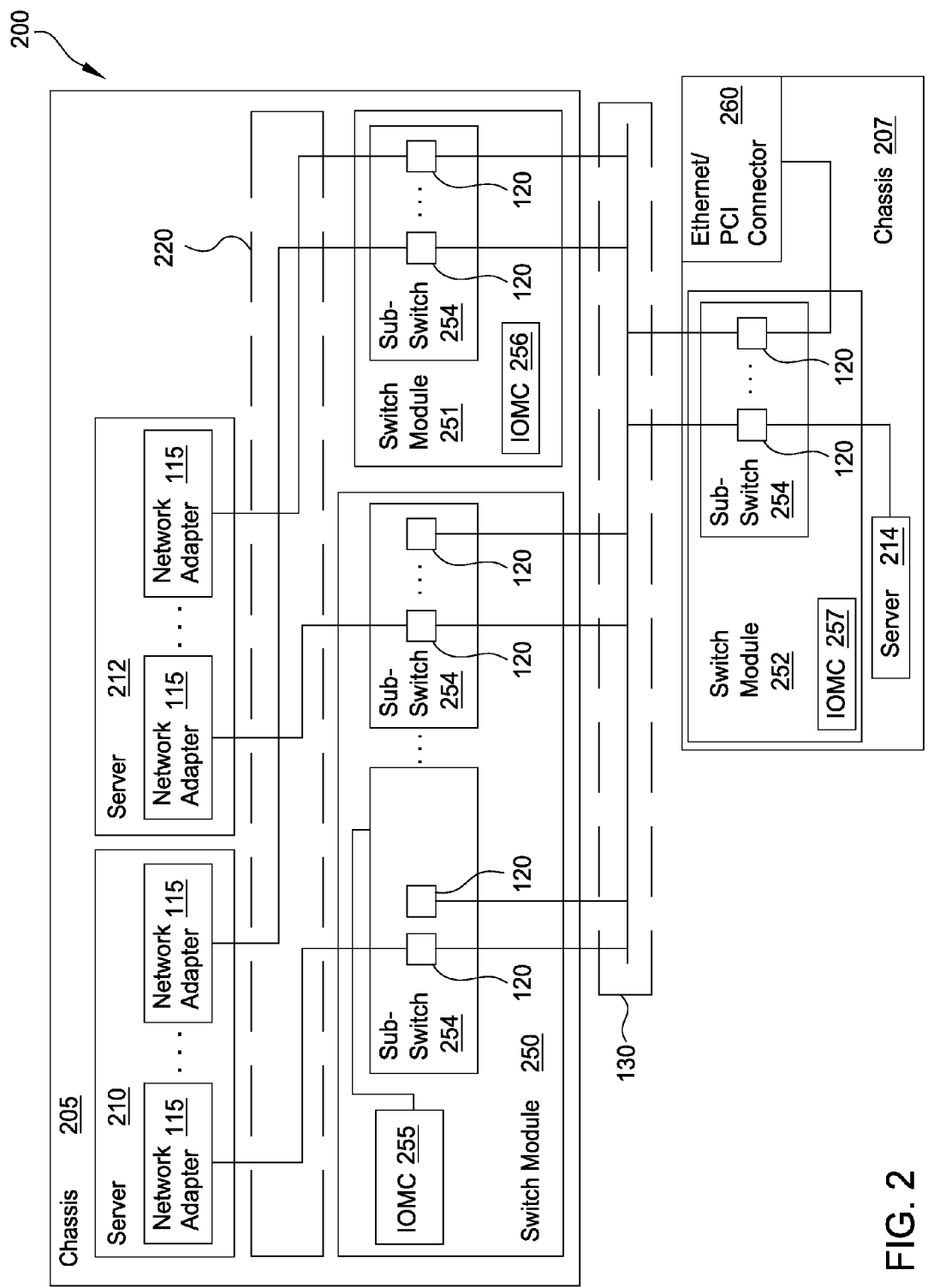
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
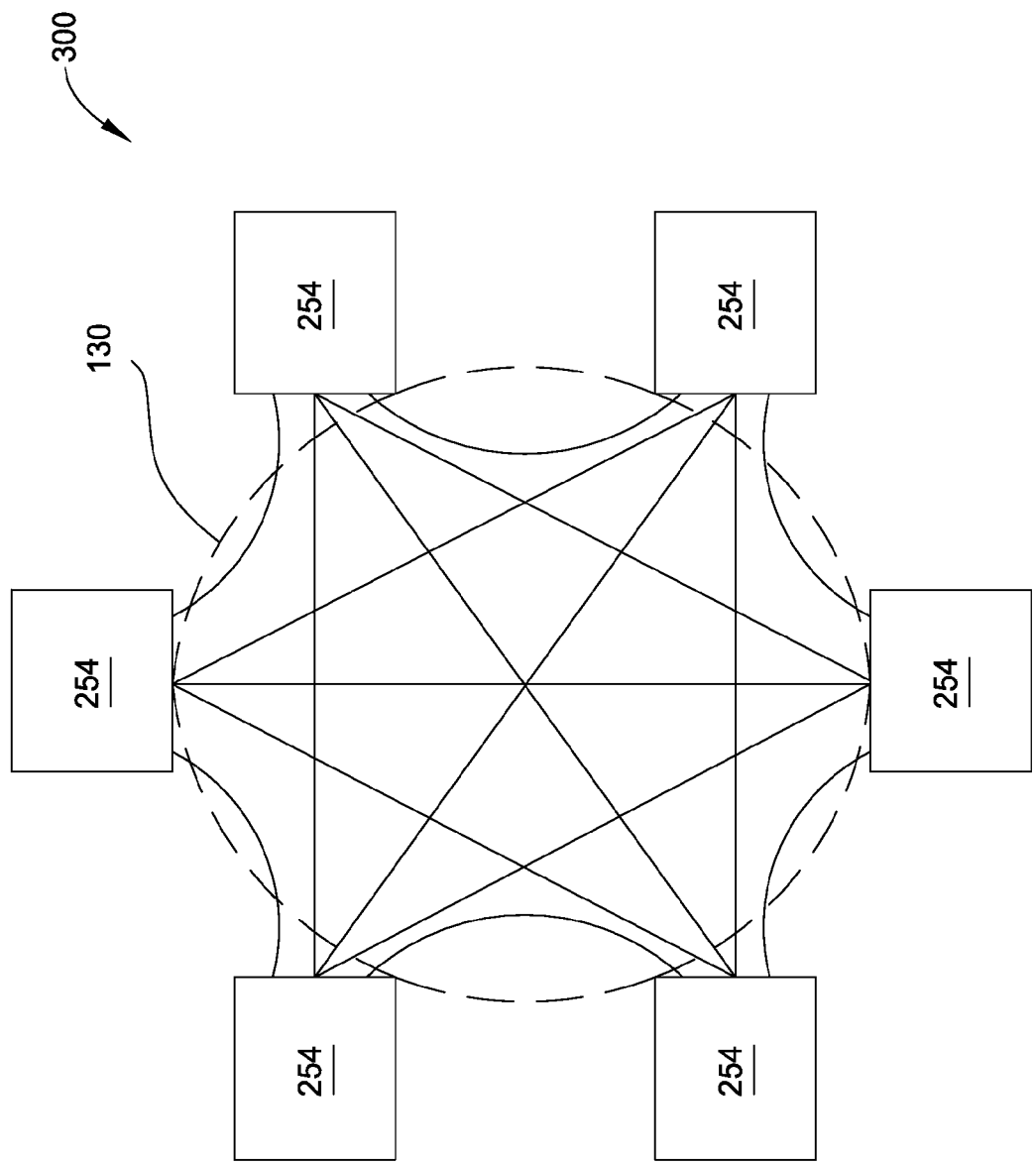
FIG. 3 illustrates a distributed, virtual switch, according to one embodiment described herein.

FIG. 3 illustrates a virtual switching layer, according to one embodiment described herein. As shown in the system 300, each sub-switch 254 in the systems 100 and 200 is connected to the other sub-switches 254 using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each of the bridge elements 120 of the sub-switches 254—i.e., each bridge element 120 has a dedicated data path to every other bridge element 120.

Figure 4:
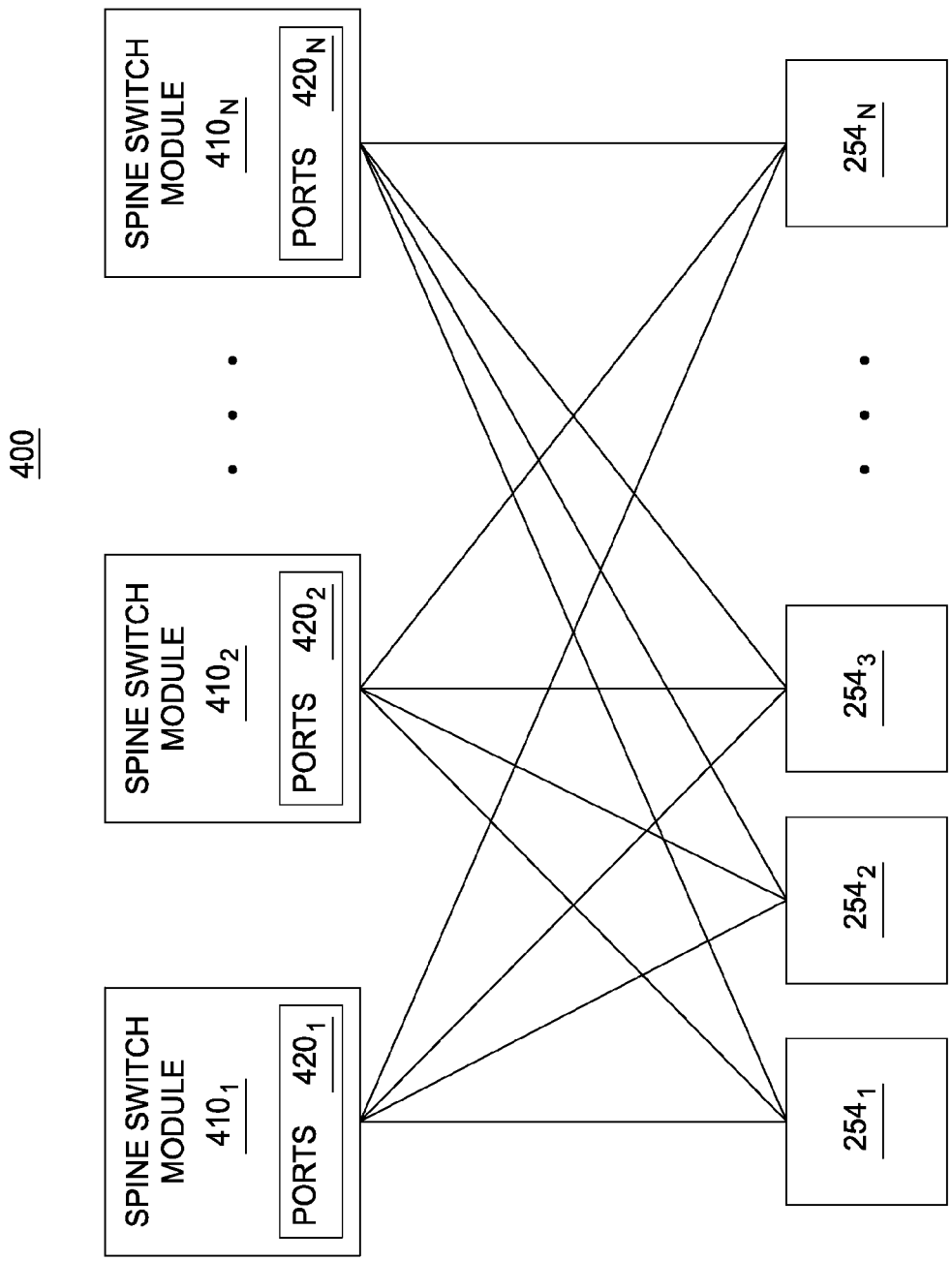
FIG. 4 illustrates a distributed, virtual switch, according to one embodiment described herein.

Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. An example of this configuration is shown in FIG. 4, which illustrates a distributed, virtual switch, according to one embodiment described herein. Generally, the sub-switches $254_{1-N}$ may reside in one or more switch modules (e.g., switch modules 250, 251, 252). As shown in the system 400, each of the sub-switches $254_{1-N}$ is connected to each of the spine switch modules $410_{1-N}$ using the respective set of ports $410_{1-N}$. Thus, each of the sub-switches $254_{1-N}$ could communicate with each of the other sub-switches $254_{1-N}$ via a spine-leaf connection schema. Additionally, although the system 400 illustrates a two-level spine-leaf configuration, other configurations could additional hierarchical levels of spine switch modules. For instance, a third level of spine switch modules could be provided above the depicted spine switch modules $410_{1-N}$, and the depicted spine switch modules $410_{1-N}$ could communicate with one another using the third level of spine switch modules.

Advantageously, increasing the number of hierarchical levels employed in the spine-leaf configuration allows the distributed switch to scale to larger sizes, without requiring individual switch modules (e.g., sub-switches $254_{1-N}$ and spine switch modules $410_{1-N}$) to have an increased number of ports. Such configurations may result in a relatively low cost distributed switch solution that includes a large quantity of inexpensive, low-port switch modules. However, such examples are without limitation and are provided for illustrative purposes only. Moreover, embodiments are not limited to any particular technique for interconnecting the sub-switches 254.

II. Event-Based Execution Buffer Management

Figure 5:
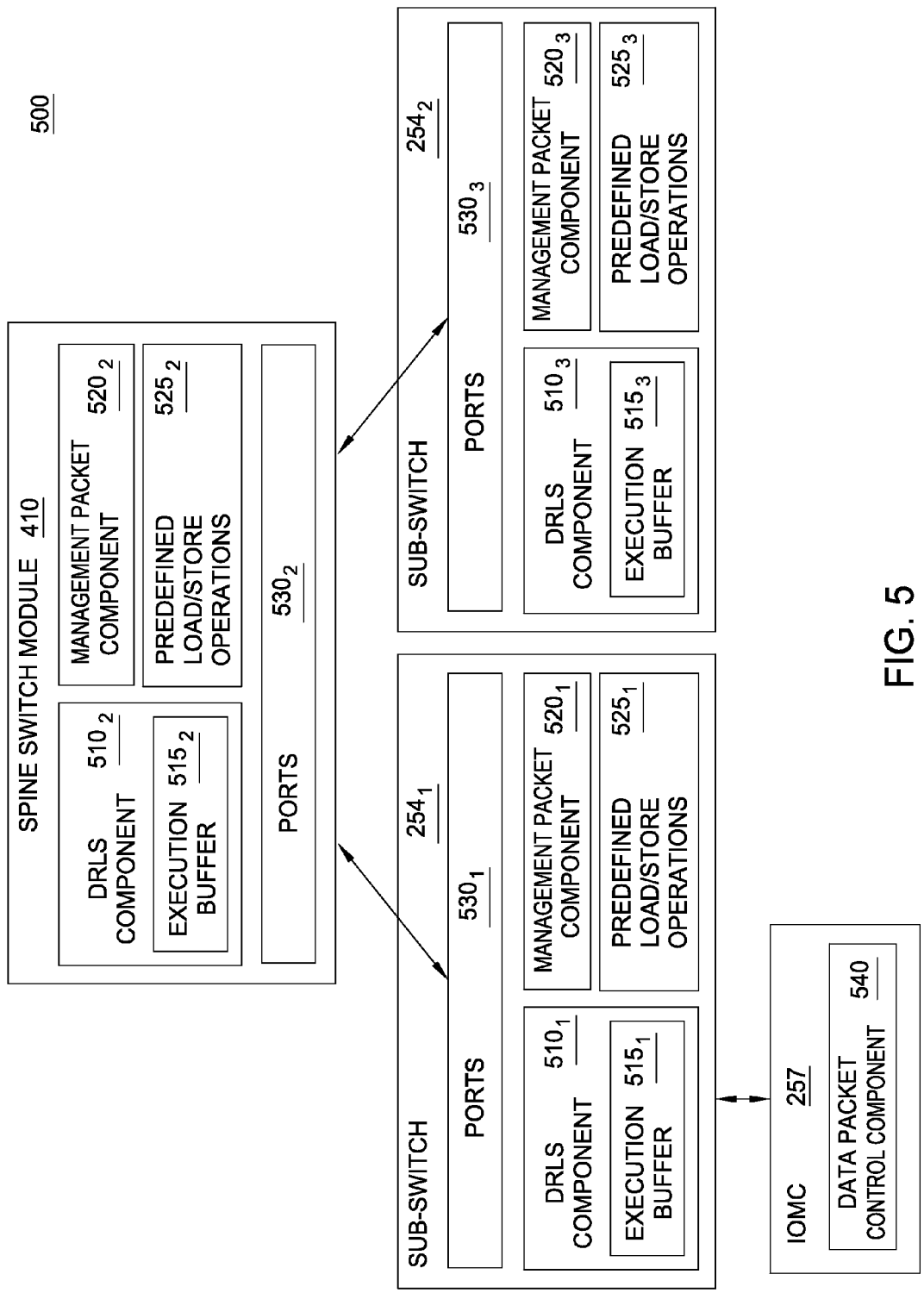
FIG. 5 illustrates a distributed, virtual switch configured with a management packet component, according to one embodiment described herein.

As discussed above, embodiments provide techniques for reacting to events in a switch module. FIG. 5 illustrates a distributed, virtual switch configured with a DRLS component, according to one embodiment described herein. As an initial note, although the system 500 illustrates a spine-leaf configuration for the distributed switch, as discussed above other configurations may be employed (e.g., the mesh connection schema in the system 300).

As shown, the system 500 includes sub-switch modules $254_{1-2}$ and a spine switch module 410. The system 500 also includes an IOMC 257 communicatively coupled to the sub-switch $254_1$. As discussed above, the IOMC 257 generally provides the control plane logic for each of the switch modules $254_{1-2}$ and 410. Additionally, each of the switch modules $254_{1-2}$ and 410 contains a respective set of ports $530_{1-3}$, a directed-route load/store (DRLS) component $510_{1-3}$, and a management packet component $520_{1-3}$. Additionally, each of the DRLS components $510_{1-3}$ contains an execution buffer $515_{1-3}$. As discussed above, each of the DRLS components $510_{1-3}$ may be configured to detect when operations are written to their respective execution buffer $515_{1-3}$ (e.g., using a DRLS master sequencer and one or more sub-sequencers) and, upon detecting the respective execution buffer $515_{1-3}$ contains load/store operations, to execute the contents of the respective execution buffer $515_{1-3}$.

Generally, the load/store operations can, when executed, perform a variety of different operations on the respective switch module. For instance, each of the switch modules $254_{1-2}$ and 410 could contain a respective set of status registers, with each of the status registers indicative of a status of a respective one of a plurality of external Ethernet ports. As an example, a status register could contain a value of "0" if the respective port is disable and a value of "1" is the respective port is enabled. In such an embodiment, a set of predefined load/store operations 525 could be adapted to disable all of the external Ethernet ports on the switch module by loading a value of "0" into each of the status registers on the switch module. More generally, however, it is broadly contemplated that the load/store operations may perform any operation on the switch module that is achievable using load/store operations.

Additionally, the IOMC 257 in the depicted embodiment is configured with a data packet control component 540. As discussed above, the data packet control component 540 could be configured to generate a management packet containing path information to a destination switch module, as well as a set of load/store operations for execution. For example, the data packet control component 540 could generate a management packet destined for the sub-switch module $254_2$, and containing a set of load/store operations that, when executed, are configured to configure and initialize the Ethernet communication ports $530_3$ on the sub-switch $254_2$.

In one embodiment, the sub-switches $254_{1-2}$ and the spine switch module 410 are interconnected using switch-to-switch communications links. In such an embodiment, the data packet control component 540 could be configured to specify the path information in the management packet using a listing of link IDs, corresponding to particular Ethernet links on each switch module along the path. For example, assume that the path information specifies the listing of "3, 2", and further includes a counter value initiated at "0". The IOMC 257 could transmit the management packet over its switch-to-switch link to the sub-switch $254_1$. The management packet component $520_1$ could then analyze the received management packet and could access the listing of link IDs using the counter value as an index, thereby retrieving the value "3" from the listing using the index position "0". The management packet component $520_1$ could then increment the counter value to "1". Advantageously, doing so enables each switch module (e.g., the sub-switches $254_{1-2}$ and the spine switch module 410) to access the appropriate link ID from the path information. Of course, this example is provided without limitation and for illustrative purposes only, and one of ordinary skill in the art will quickly recognize that any number of other implementations could be employed, consistent with the present disclosure.

Additionally, the management packet component $520_1$ could determine a link ID of the link of the switch-to-switch communications network on which the sub-switch $254_1$ received the management packet. For purposes of this example, assume that the management packet component $520_1$ determines that the management packet was received on a link having the link ID "7". The management packet component $520_1$ could then insert the link ID into the management packet as a return link value. By inserting the return link values into the management packet at each switch module between the source (e.g., the IOMC 257) and the destination (e.g., the sub-switch $254_2$), embodiments provide the destination switch module (e.g., the sub-switch $254_2$) with the return path information for transmitting an acknowledgement message back to the source (e.g., the IOMC 257).

Additionally, the management packet component $520_1$ could be configured to update a second counter value within the management packet. For example, the second counter value could be initialized to a value of "0" when the IOMC 257 creates the management packet, and each switch module (e.g., the sub-switches $254_{1-2}$ and the spine switch module 410) that inserts a return link value into the management packet could increment this second counter value. Advantageously, doing so preserves the relationship between each switch module along the path from the source module to the destination module. Of course, such an example is provided for illustrative purposes only and without limitation. Moreover, it is broadly contemplated that any number of different techniques for maintaining return path information can be employed, consistent with embodiments described herein.

Once the return link value is inserted into the management packet, the management packet component $520_1$ could forward the management packet to the spine switch module 410 over its link having the link ID of "3", in accordance with the information within the management packet. Of note, although only the switch modules along the path of the management packet (e.g., the switch modules $254_{1-2}$ and the spine switch module 410) are shown in the system 500, such a depiction is for illustrative purposes only. More generally, each of the switch modules within a distributed switch may have any number of links over the switch-to-switch communications network, with each of the links corresponding to a different switch module within distributed switch (as well as Ethernet links to external devices). As such, a message forwarded over a first one of the links could be received by a particular switch module within the distributed switch, while the same message forwarded over a different link could be received by a different switch module within the distributed switch. Thus, by specifying a listing of link IDs in the packet, embodiments can effectively control the path the management packet takes through the switch module.

Upon receiving the packet, the management packet component $520_2$ could insert a return link value into the packet, based on the link of the spine switch module 410 on which the packet was received. Additionally, the management packet component $520_2$ could determine that the spine switch module 410 is not the destination for the packet. Accordingly, the management packet component $520_2$ could access the path information within the packet and could determine an outgoing link on which to forward the management packet. Continuing the above example of the path information specifying the listing of "3, 2", the management packet component $520_2$ could access the listing with the index position of "1" (i.e., based on the counter value within the management packet incremented from "0" to "1" by the management packet component 5200 and could determine that the outgoing link with link ID "2" should be used. The management packet component $520_2$ could then increment the counter value within the packet from "1" to "2", and could forward the management packet to the sub-switch $254_2$, over the link for the switch-to-switch communications network with link ID "2".

Upon receiving the data packet, the management packet component $520_3$ could determine that the sub-switch $254_2$ is the destination switch module for the packet. For example, the management packet component $520_3$ could access the listing of link IDs within the packet using the updated counter value within the packet of "2" as an index, and could determine that no link ID exists at this index position, indicating that the sub-switch $254_2$ is the destination switch module for this packet. Based on this determination, the management packet component $520_3$ could copy the set of load/store operations within the packet into the execution buffer $515_3$.

Generally, the DRLS component $510_3$ monitors the contents of the execution buffer $515_3$ to determine when any load/store operations are copied into the execution buffer $515_3$. Upon detecting that the execution buffer $515_3$ contains one or more load/store operations, the DRLS component $510_3$ could automatically execute the load/store operations. For instance, the DRLS component $510_3$ could execute the load/store operations sequentially in the order in which they are placed into the execution buffer $515_3$. Thus, once the management packet component $520_3$ copies the set of load/store operations within the packet into the execution buffer $515_3$, the DRLS component $510_3$ could detect the load/store operations within the execution buffer $515_3$ and could automatically execute these load/store operations.

Once all of the load/store operations within the packet have been executed, the management packet component $520_3$ could transmit an acknowledge message back to the source module from which the management packet was received (i.e., the IOMC 257 in this example). Generally, the acknowledgement message contains the return link information from the corresponding management packet. That is, the acknowledgement message contains information specifying the link ID of the link on which the management packet was received at each intermediary switch module, as the packet was transmitted from the source module to the destination module. In one embodiment, the management packet component $520_3$ is configured to transmit a predefined acknowledgement message to the source module. In a particular embodiment, the management packet component $520_3$ is configured to transmit the management packet itself back to the source module, as an indication that the management packet was received and successfully processed by the destination module (i.e., the sub-switch $254_2$ in this example).

Generally, the acknowledgement message is transmitted back to the source module using the return path information within the management packet. That is, as each intermediary switch module (e.g., the sub-switch $254_1$ and the spine switch module 410, in this example) recorded in the management packet the respective link ID on which the management packet was received as the packet was transmitted from the source module to the destination module, these incoming links can be used as outgoing links when sending the acknowledgement message from the destination module to the source module. Thus, the spine switch module 410 could receive the acknowledgement message, and the management packet component $520_2$ could access the return link information within the message to determine the link on which the spine switch module 410 the original management packet was received on. Thus, in this example, the management packet component $520_2$ could determine that the management packet was received over the link connecting the spine switch module 410 with the sub-switch $254_1$, and could forward the acknowledgement message to the sub-switch $254_1$ over the determined link. Likewise, the management packet component $520_1$ could inspect the return link information within the packet and could determine that the management packet was originally received over the link connecting the sub-switch $254_1$ with the IOMC 257. Accordingly, the management packet component $520_1$ could forward the acknowledgement message to the IOMC 257 over the determined link. As discussed above, in one embodiment, the management packet component $520_1$ could notify the IOMC 257 of the received acknowledgement message using PCIe operations and/or Ethernet communications. More generally, it is broadly contemplated that the management packet component $520_1$ may use any number of different techniques to notify the IOMC 257 of the acknowledgement message, consistent with the present disclosure.

Once the acknowledgement message reaches the IOMC 257, the data packet control component 540 could determine that the management packet was received by the destination switch module (i.e., the sub-switch $254_2$, in this example) and that the load/store operations were executed. Advantageously, embodiments enable a single entity within a distributed network switch (e.g., the IOMC 257) to control the actions of other switch modules within the distributed switch, and to do so even when the Ethernet communication links within the distributed switch are unavailable (e.g., before they are configured and initialized). That is, because embodiments utilize a second communications network between the nodes of the distributed switch, embodiments need not rely on the Ethernet communication links in order to transmit packets between the switch modules of the distributed switch. This may be particularly advantageous, for example, when embodiments are used to configured the Ethernet communication links of the various switch modules within the distributed switch.

As discussed above, in one embodiment, the controller is configured to directly insert the management packet into a buffer on the first switch module associated with the first hop of the packet using PCIe communications. For example, the IOMC 257 could check to ensure that an IOMC Send Buffer within the DRLS component 510 on the sub-switch module $254_1$ is not in use. To do so, the IOMC 257 could use PCIe operations to access a chip register ring in order to read an IOMC Send Buffer Status register within the DRLS component 510. Upon detecting that the IOMC Send Buffer is not in use (e.g., from a previous operation), the IOMC could send PCIe operations configured to load the IOMC Send Buffer with a management packet.

In response, the DRLS component 510 could detect a write to an IOMC Action register and could queue the management packet for processing. The DRLS component 510 could then check to ensure than an output buffer for the outgoing link of the sub-switch module $254_1$ specified within the management packet is not busy. For example, the DRLS component 510 could check a Buffer Busy Status register associated with the outgoing link. The DRLS component 510 could then move the management packet from its own internal IOMC Send Buffer to the execution buffer. Upon determining that the sub-switch module $254_1$ is not the destination of the packet, the DRLS component 510 could copy the management packet into an ILS Send Buffer associated with the outgoing link specified in the header portion of the management packet. The DRLS component 510 could set a bit corresponding to the output link in a local Buffer Busy Status register, and could then push the packet to the ILS Send Buffer for the outgoing link via a register ring on the switch module $254_1$. As a result, the packet could then be written to the next switch element along the path by an iLink communications component associated with the ILS Send Buffer. When the iLink communications component has finished using the ILS Send Buffer, it could clear the corresponding bit in the DRLS Buffer Busy Status register, so that the DRLS component 510 is free to process another request having the same output link.

Likewise, when the acknowledgement message is received at the sub-switch module $254_1$, an ILR component on the switch module $254_1$ could detect the inbound response. The ILR component could then determine that the acknowledgement message has reached its destination (e.g., based upon the hop counter value within the message being decremented back to 0, in an embodiment where the hop counter value is decremented at each hop along the path). In response, the ILR component could indicate that it has received a packet to the DRLS component 510. For example, the ILR component could indicate this by writing an ILR Action register within the DRLS component 510 with the inbound link and the destination link (e.g., xFF, which in one embodiment is special encode for the IOMC). The DRLS component 510 could detect the write to the ILR Action register and, in response, could queue the acknowledgement message (e.g., including the input and output link IDs) in a queue for DRLS operations. In one embodiment, before selecting the queued request, the DRLS component 510 first checks to ensure that an IOMC Receive Buffer is not Busy (from a previous response not yet serviced by IOMC). For example, the DRLS component 510 could check a local Buffer Busy Status register within the DRLS component 510.

At some point, the DRLS component 510 processes queued request. For instance, the DRLS component 510 could pull the packet over a register ring by issuing register reads to the ILR Receive buffer corresponding to the link that queued the request (i.e., the link on which the request was received). The DRLS component 510 could then determine that the destination (e.g., xFF) corresponds to the IOMC 257, and could move the packet contents directly to an internal IOMC Receive Buffer. The DRLS component 510 could then set a status bit in a DRLS register. In one embodiment, the IOMC 257 is anticipating a response/acknowledge to the transmitted management packet, and as a result is polling the register using PCIe operations (e.g., which allow it access to the chip register ring on the switch module 2540. Upon detecting the status bit, the IOMC 257 could determine that an acknowledgement packet has been received and could use PCIe operations to read the IOMC Receive Buffer contents (i.e., the buffer on the sub-switch $254_1$ containing the acknowledgement message). The IOMC 257 could then clear the IOMC Receive Buffer Busy status bit, allowing the DRLS component 510 to process another response destined for the IOMC 257.

As discussed above, a DRLS component 510 is generally configured to monitor the execution buffer 610 and, upon detecting load/store operations are contained within the buffer 610, to execute the load/store operations. The DRLS component 510 may monitor the contents of the execution buffer 610 in a variety of ways. For instance, the DRLS component 510 could employ a master sequencer and a number of sub-sequences to carry out this functionality, e.g., a master sequencer, a transfer sub-sequencer and a processing sub-sequencer. As an example, the master sequencer could generally maintain an idle state until one of the predefined events occurs. Upon detecting an occurrence of an event, the master sequencer could leave the idle state and could advance to a transfer state. In response, the transfer sub-sequencer could leave its idle state and could transfer a pre-defined sequence of load/store operations into the execution buffer. At this point, the transfer sub-sequence could return to its idle state, and the master sequencer could advance to a processing state. Accordingly, the processing sub-sequencer could execute the contents of the execution buffer (i.e., the pre-defined sequence of load/store operations) and, once completed, could return to its idle state. Finally, the master sequencer could return to its idle state, until the next event is detected.

In one embodiment, the DRLS component 510 is configured to selectively modify the set of predefined load/store operations while copying the operations into the execution buffer. For instance, the DRLS component 510 could be configured to selectively replace certain operations within the set of load/store operations with a NOP operation, in order to prevent these certain operations from being executed. For example, assume that the set of predefined load/store operations are designed to disable all of the ports on a switch module by writing a value of "0" (e.g., using an AND load/store operation) to the respective configuration register associated with each of the ports. However, further assume that it is known (e.g., to a network administrator) that certain registers within a particular switch module are defective (e.g., as a result of the manufacturing process). In such an embodiment, the DRLS component 510 could be configured to selectively substitute NOP commands in place of any load/store operations associated with these defective registers, in order to avoid executing any load/store operations involving these defective registers. Advantageously, doing so allows the predefined sequence of load/store operations to be dynamically updated, based upon the current configuration of the switch module.

Figure 6:
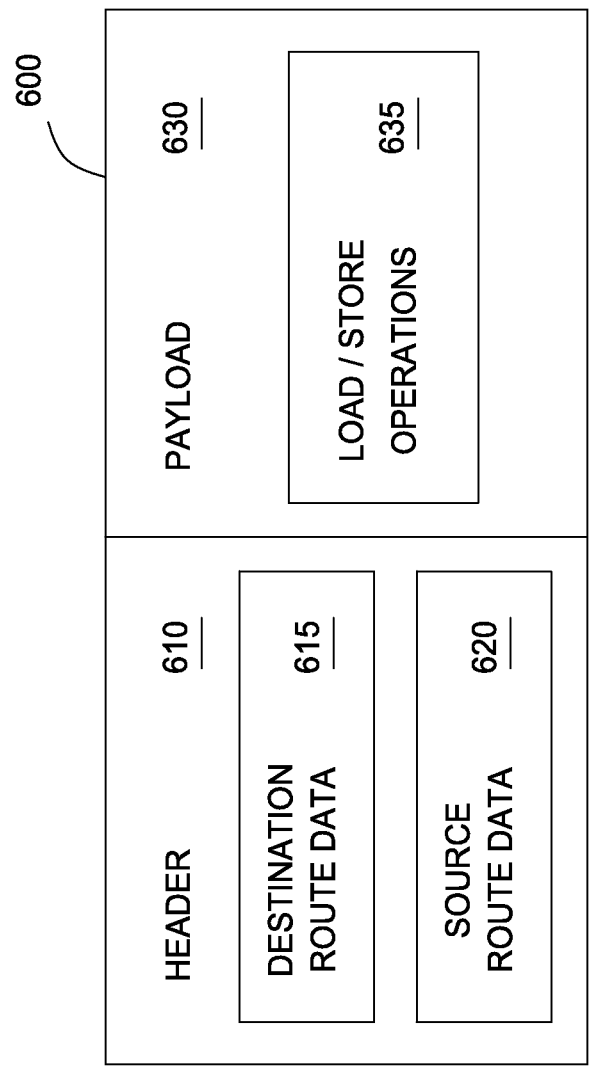
FIG. 6 illustrates a packet containing route data and a set of load/store operations, according to one embodiment described herein.

FIG. 6 illustrates a packet containing route data and a set of load/store operations, according to one embodiment described herein. As shown, the packet 600 includes a header portion 610 and a payload portion 620. The header portion 610 contains destination route data 615, which specifies a route from a source module to a destination module, and source route data 620, which specifies a route from the destination module to the source module. In one embodiment, the destination route data 615 and/or source route data 620 include a listing of link identifiers, with each link identifier corresponding to a respective switch module within the distributed switch. As discussed above, the source module could insert the destination route data 615 into the packet 600 when the packet 600 is created. The source route data 620 could be created as the packet is transmitted from the source module to the destination module, with each intermediary switch module updating the source route data 620 based on a link identifier of the link of the respective intermediary switch module on which the packet was received.

The load/store operations 635 generally specify register operations for loading and/or storing values on a switch module. For example, a load operation could specify a value to be loaded into at least one register of a switch module. As another example, a store operation could specify a value from at least one register of a switch module to be stored to memory. In one embodiment, the load/store operations 635 are predefined. In a particular embodiment, the load/store operations 635 are dynamically determined when the packet 600 is created.

Generally, the load/store operations relate to loading values into at least one of the registers (i.e., a load operation) and/or storing a value from at least one of the registers in a memory of the switch module (i.e., a store operation). However, it is broadly contemplated that load/store operations, as used herein, can include more than simple load and store register operations, and more generally may include any operations related to loading, storing and/or modifying values within registers. For example, the load/store operations could include, without limitation, a load operation (e.g., that reads a 64 bit value from a register), a store operation (e.g., the writes a 64 bit value to a register), an AND operation (e.g., that reads a 64 bit value from a register, applies a 64 bit AND mask to zero out any combination of bits, and stores the updated 64 bit value back to the same register), an OR operation (e.g., the reads a 64 bit value from a register, applies a 64 bit OR mask to set any combination of bits to "1", and stores the updated 64 bit value back to the same register), a COMPARE/SWAP operation (e.g., that reads a 64 bit value, compares the value to a command-supplied COMPARE value, and stores a command-supplied SWAP value back to the same register if the comparison is TRUE), and an ANDOR operation (e.g., that reads a 64 bit value from a register, applies an AND mask to set any combination of bits to "0", applies an OR mask to set any combination of bits to "1", and stores the resulting 64 bit value back to the same register). Still other commands may include, without limitation, a sequential load operation (e.g., a load operation that targets multiple registers having sequential addresses), a sequential store operation, a sequential AND operation, a sequential OR operation, a sequential COMPARE/SWAP operation, and a sequential AND/OR operation. However, all of the above examples are provided for illustrative purposes only, and one of ordinary skill in the art will quickly recognize that examples of load/store operations can include these and many other operations, consistent with the present disclosure.

Generally, the set of load/store operations can be adapted to perform a particular operation(s) on a switch module. For example, a controller (e.g., the IOMC 257) could generate a packet containing a set of load/store operations that are configured to, when executed, configure and initialize the Ethernet communication links on a particular switch module within a distributed switch. For instance, the controller could transmit such a packet for each switch module within the distributed switch, in order to initialize Ethernet communications for all of the switch modules within the distributed switch. Moreover, by using a separate protocol (i.e., separate from OSI-model communications) to transmit the packet to each of the switch modules over the switch-to-switch links, embodiments can transmit load/store operations to a remote node for execution, regardless of the status of OSI-model Ethernet communications within the distributed switch.

Figure 7:
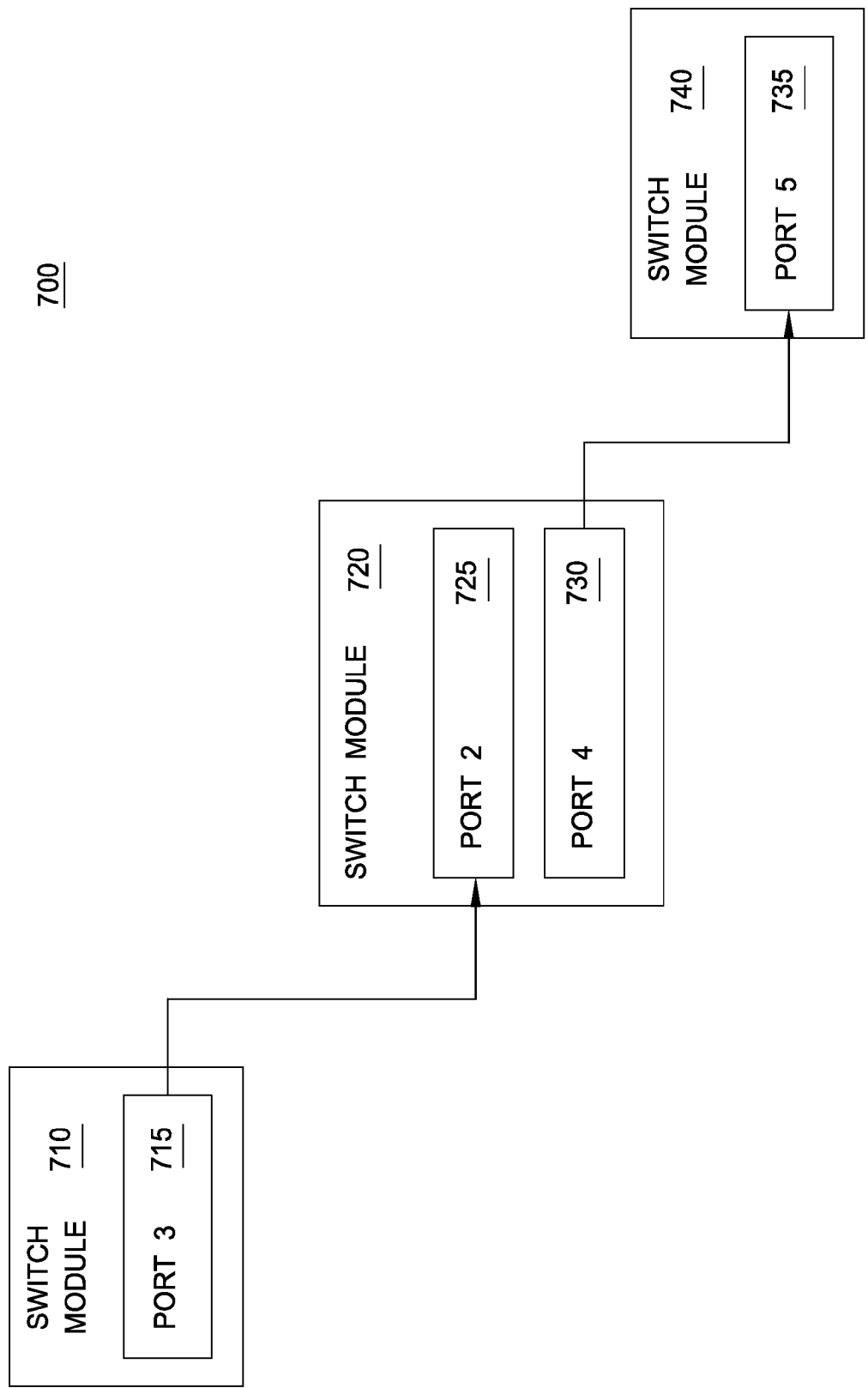
FIG. 7 illustrates a flow of a packet through a series of switch modules, according to one embodiment described herein.

FIG. 7 illustrates a flow of a packet through a series of switch modules, according to one embodiment described herein. As shown, the system 700 includes switch modules 710, 720 and 740. For purposes of this example, assume that the switch module 710 is the source module that creates the management packet and the switch module 740 is the destination module receiving the packet and executing the load/store operations contained therein. In one embodiment, the management packet could originate on a separate module (e.g., the IOMC 257) and could be inserted into the switch module 710 (e.g., using PCIe operations). As discussed above, the management packet created by the source module generally contains path information specifying the path from the source module to the destination module. For example, the path information could include a listing of ports to use at switch modules along the route from the source module to the destination module. For example, in this example, since the switch module 720 is coupled to the destination switch module 740 at the port 730 having a port identifier of "4", the path information in the packet could specify the value "4". In one embodiment, the path information also includes an identifier for the port connecting the source module with the first intermediary switch module along the path. Thus, since the source switch module 710 is coupled to the switch module 720 at the port 715 having a port identifier of "3", the path information could specify the listing of "3,4", indicating that the packet should be transmitted using the port "3" at the source module and port "4" on the switch module 720, after the packet's first hop.

Additionally, as discussed above, the intermediary switch module(s) along the path from the source module to the destination module could update source route data within the packet, as the packet passes through the intermediary switch module(s). Thus, in this example, when the switch module 720 receives the packet from the switch module 710 on the port 725 having a port identifier of "2", logic on the switch module 720 (e.g., a management packet component 520) could insert the value of "2" into a listing of source ports within the packet. The switch module 720 could then forward the packet on to the switch module 740, using the path information specified within the packet.

Upon receiving the packet at the port 735 having a port identifier of "5", logic on the switch module 740 could copy the load/store operations within the packet into an execution buffer. A DRLS component 510 on the switch module 740 could then detect the load/store operations within the execution buffer and, responsive to the detection, could execute the load/store operations.

Figure 8:
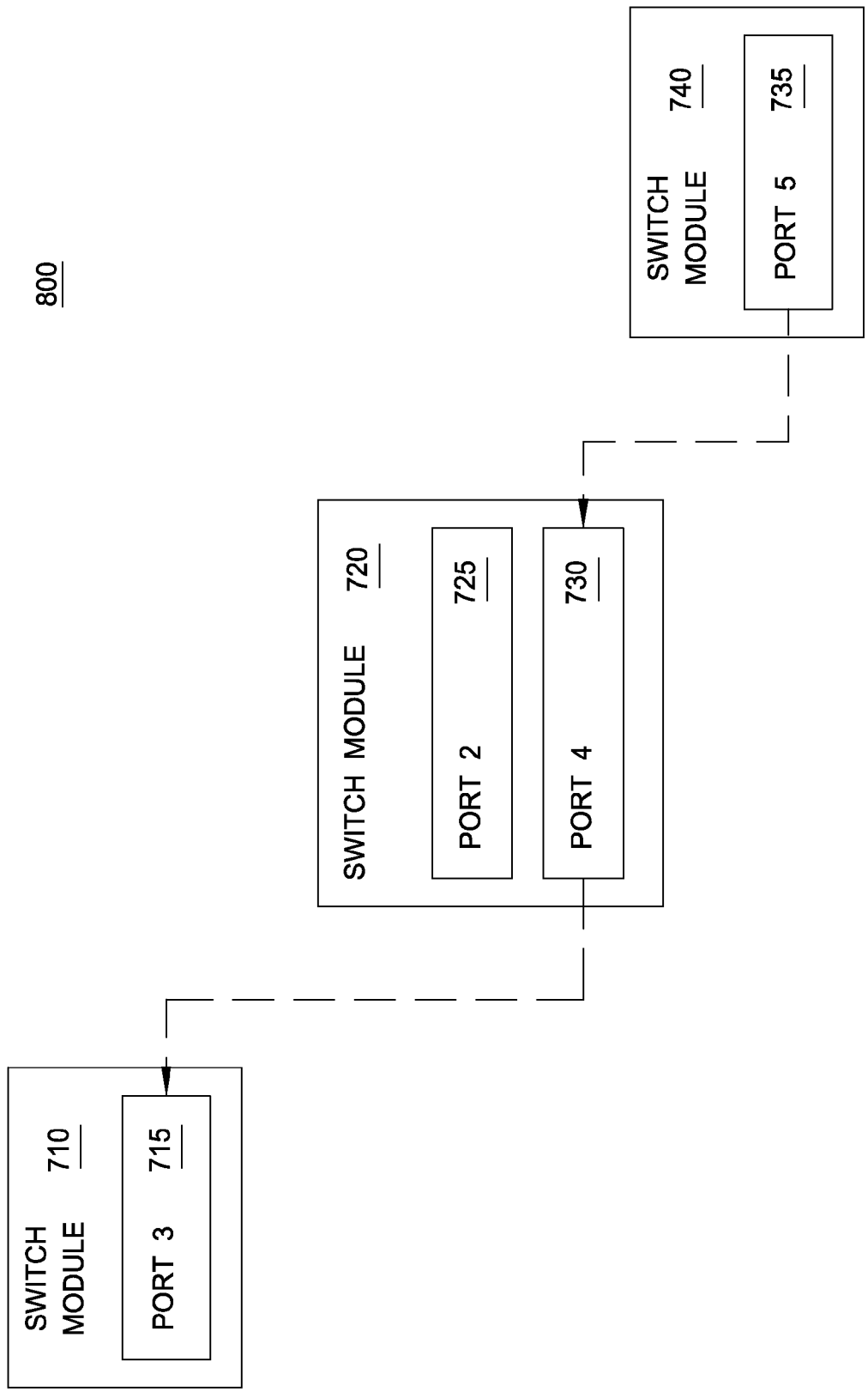
FIG. 8 illustrates a flow of a packet through a series of switch modules, according to one embodiment described herein.

FIG. 8 illustrates a return path of a packet through a series of switch modules, according to one embodiment described herein. As shown, the system 800 includes the switch modules 710, 720 and 740. Here, once the switch module 740 has finished executing the load/store operations within the management packet, the packet is transmitted across the link 735 having an identifier of "5". Generally, the switch module 740 is configured to transmit the management packet (or more generally, any acknowledgement message) using the port on which the switch module 740 initially received the management packet. The switch module 720 then receives the acknowledgement message and determines that the packet should be forwarded to the switch module 710 using the port 725 having the identifier of "2". Additionally, the switch module 720 modifies a hop counter value within the management packet (e.g., by decrementing the hop counter value). The switch module 720 then forwards the modified packet to the switch module 710, using the port 725. The switch module 710 then receives the packet on port 715. In the event the switch module 710 is the destination for the packet, the switch module 710 could process the received acknowledgement message. As discussed above, in one embodiment the switch module 710 is configured to notify the IOMC 257 that the acknowledgement message has been received, and the IOMC 257 is then configured to retrieve the acknowledgement message using PCIe operations.

Figure 9:
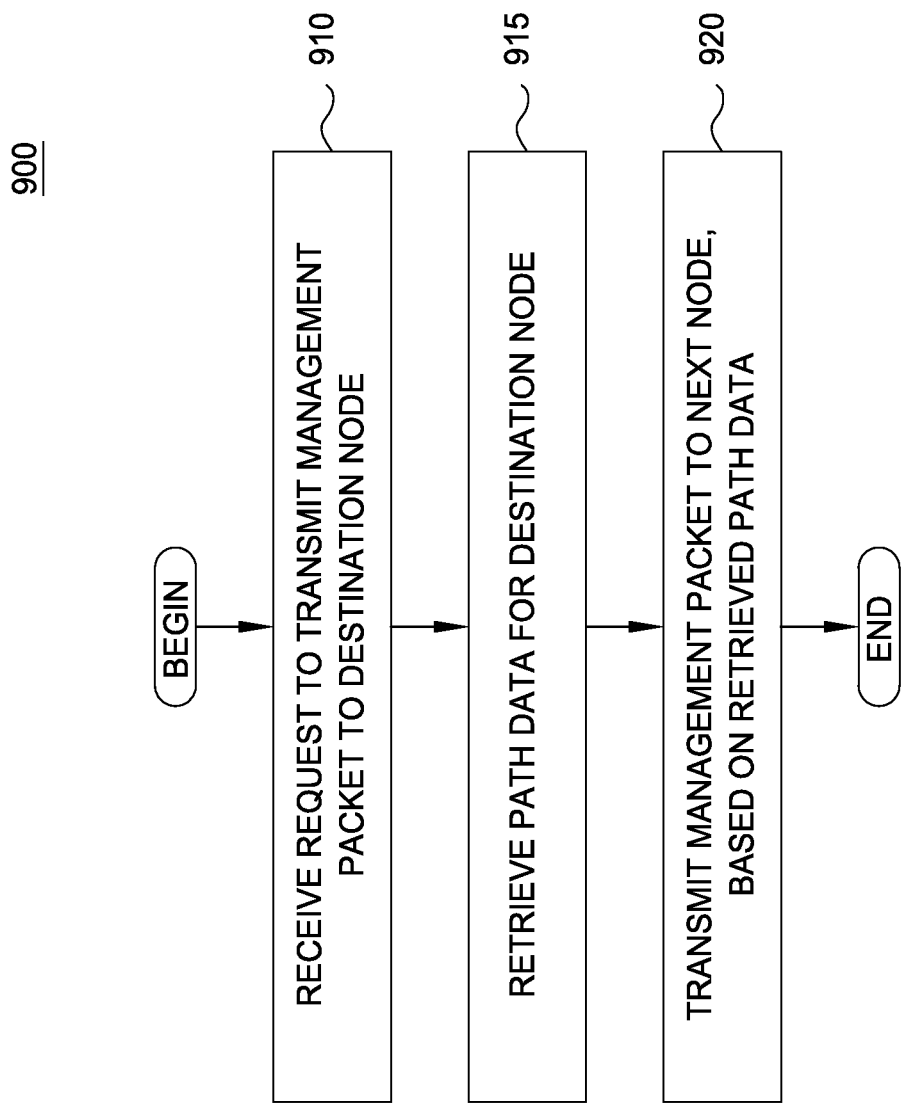
FIG. 9 is a flow diagram illustrating a method for generating a management packet, according to one embodiment described herein.

FIG. 9 is a flow diagram illustrating a method for generating a management packet, according to one embodiment described herein. As shown, the method 900 begins at block 910, where a source module (e.g., a control module such as IOMC 257) receives a request to transmit a management packet to a destination node. In one embodiment, the request identifies a set of load/store operations to be transmitted to the destination node. The source module then retrieves path data for the specified destination node (block 915). As discussed above, the path data could include an ordered listing of link IDs, where each link ID in the listing corresponds to a respective hop along the path from the source switch module to the destination switch module. In one embodiment, the path data may be expressed using a comma delimited string of link IDs. However, such examples are provided without limitation and for illustrative purposes only. Moreover, it is broadly contemplated that any format capable of describing the path from the source switch module to the destination switch module may be used, consistent with the functionality described herein.

Logic on the source module could then create a data packet containing the retrieved path data and a set of predefined load/store operations. For example, assuming that the IOMC 257 is the source module, the data packet control component 540 could receive a request containing an identifier corresponding to a particular set of predefined load/store operations (e.g., an identification number used to access a map containing distinct sets of predefined load/store operations) and could retrieve the corresponding set of load/store operations for the identifier. The retrieved load/store operations could then be included in the generated packet, along with the retrieved path information.

Additionally, as discussed above, the generated packet may include a hop counter value. Generally, the hop counter value is configured to be incremented at each hop along the path, and may be used by the various switch modules along the path to determine which switch-to-switch link ID within the listing of link IDs should be used by each of the switch modules along the path. For instance, the hop counter value could be used as an index into the listing of link IDs. The source switch module then transmits the generated packet to a next node, based on the path data (block 920), and the method 900 ends.

For example, a first switch module along the path could generate a packet with a hop counter value of "1" and could determine that the packet should be transmitted on the switch-to-switch link on the first switch having a link ID corresponding to the first link ID within the packet. The first switch module could then increment the hop counter value to "2" and could transmit the packet across the determined link. A second switch module could then receive the packet, access the second link ID within the listing (i.e., based on the hop counter value of "2"), increment the hop counter value to "3", and forward the packet across the second switch module's switch-to-switch link corresponding to the second link ID within the listing. This process could continue, until the packet reaches the destination node within the distributed switch.

Figure 10:
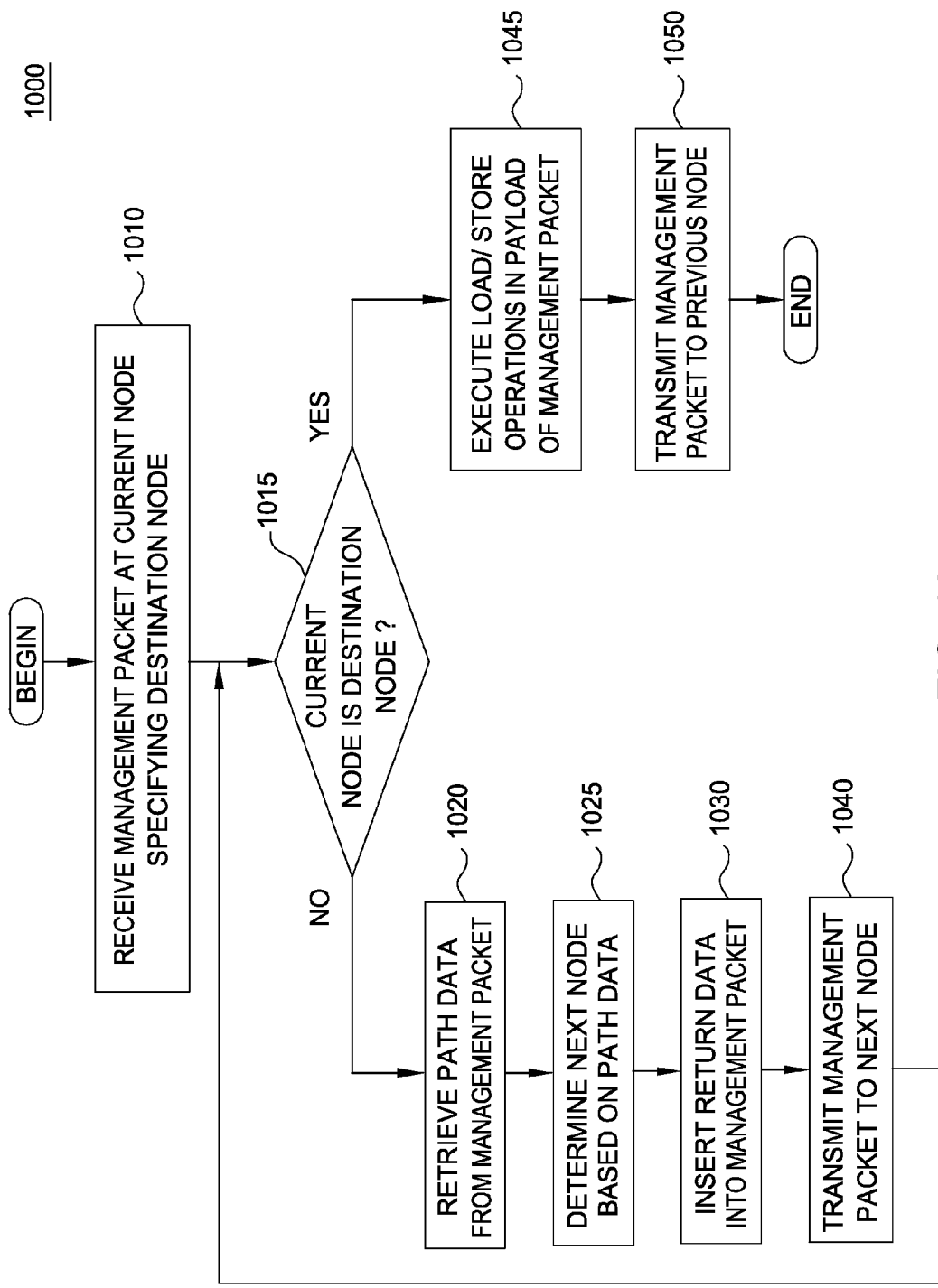
FIG. 10 is a flow diagram illustrating a method for transmitting a management packet to a destination node, according to one embodiment described herein.

FIG. 10 is a flow diagram illustrating a method for transmitting a management packet to a destination node, according to one embodiment described herein. As shown, the method 1000 begins at block 1010, where a management packet component 520 receives the management packet at a current switch module. The management packet component 520 then determines whether the current switch module is the destination for the received packet (block 1015). For example, the management packet component 520 could use a hop counter value within the packet as an index into the listing of link IDs within the packet, and if doing so returns a link ID within the listing, the management packet component 520 could determine it is not the destination of the packet. That is, since each link ID within the listing of link IDs corresponds to a different hop along the path from the source switch module to the destination switch module, the management packet component 520 could determine that the path is not yet complete, and as such, the current switch module is not the destination for the packet.

In such a case, the management packet component 520 could retrieve the path data from the packet (block 1020) and could determine a switch-to-switch link of the current switch module on which to forward the packet (block 1025). For example, the management packet component 520 could determine that the switch-to-switch link corresponding to the retrieved link ID from the listing of link IDs should be used to forward the packet. Additionally, the management packet component 520 inserts return path data into the data packet (block 1030). In one embodiment, the return path data comprises an ordered listing of link IDs, that is created as the packet travels from the source switch module to the destination switch module. In such an embodiment, the management packet component 520 could insert a link ID corresponding to the switch-to-switch link of the current switch module on which the data packet was received. Additionally, the management packet component 520 could The management packet component 520 then transmits the data packet across the switch-to-switch link of the current switch module, corresponding to the retrieved link ID from the listing of link IDs (block 1040), and the method 1000 returns to block 1015, where the next switch module along the path processes the data packet.

If, at block 1015, the management packet component 520 (e.g., on the current switch module or on the next switch module, after block 1040 has completed) determines that the hop counter value, when used as an index into the listing of link IDs, does not return a value (i.e., when the hop counter value references a position greater than the size of the listing), then the management packet component 520 could determine that the current switch module is the destination for the packet. The management packet component 520 could then copy the set of predefined load/store operations within the payload of the packet, into an execution buffer 515 on the current switch module. A DRLS component 510 could then detect the operations within the execution buffer 515 and could automatically execute the set of predefined load/store operations on the current switch module (block 1045).

Once the operations have been executed, the management packet component 520 could transmit the packet across the switch-to-switch link of the current switch module on which the packet was originally received (block 1050), and the method 1000 ends. As discussed above, although embodiments transmit data packets (or, more generally, network messages) across switch-to-switch links, embodiments may utilize a communications protocol that is separate and distinct from OSI-model communications. Advantageously, doing so enables the management packet component 520 to transmit data packets through the distributed switch, regardless of whether the logic to manage OSI-model communications (e.g., layer 2 switch traffic) is operational.

Figure 11:
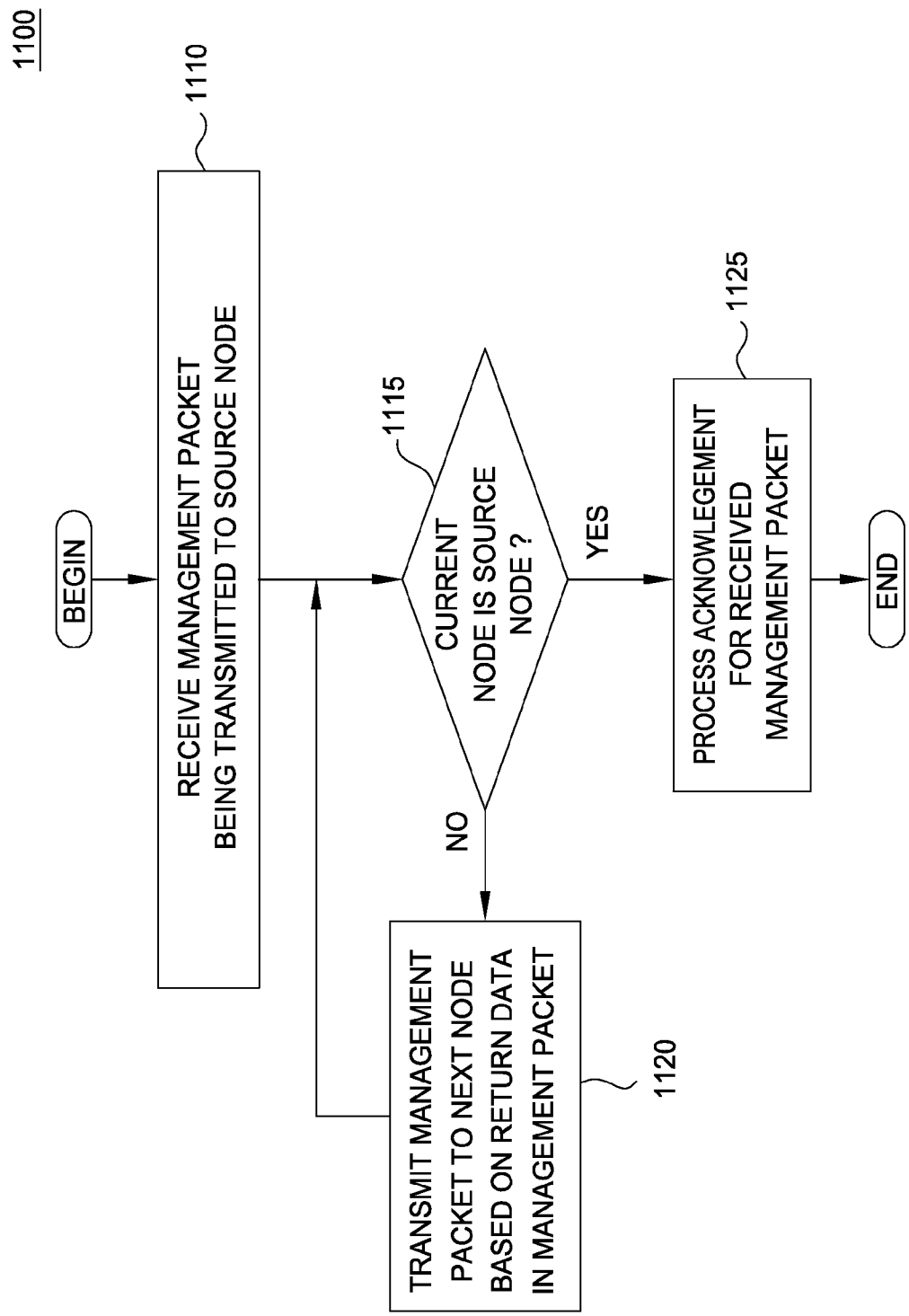
FIG. 11 is a flow diagram illustrating a method for transmitting a management packet to a source node, according to one embodiment described herein.

FIG. 11 is a flow diagram illustrating a method for transmitting a management packet to a source node, according to one embodiment described herein. In this example, assume that the destination switch module has already received the management packet, executed the load/store operations contained in the management packet (block 1045) and has transmitted the management packet to the previous switch module (block 1050) for transmission back to the source switch module. As shown, the method 1100 begins at block 1110, where the management packet component 520 (i.e., at the previous switch module) receives the management packet being transmitted to a source switch module.

The management packet component 520 then determines whether the current switch module is the source switch module where the packet originated (block 1115). If not, the management packet component 520 transmits the management packet to a next switch module in the path, based on the return data in the header of the management packet (block 1120), and the method returns to block 1115 for the next switch module in the path. That is, the management packet component 520 could access the return path information (i.e., the path information inserted into the management packet at block 1030) in the packet and could determine an Ethernet link of the current switch module on which to transmit the packet. As an example, the return path data could include a listing of switch-to-switch link identifiers, and the management packet component 520 could access a return hop counter value within the packet and could use this hop counter value (e.g., as an index) to determine which of the switch-to-switch link identifiers in the listing should be used at the current switch module.

Generally, the packet may be passed through the distributed switch until one of the switch modules determines that it is the switch module that the packet is destined for. For example, return to the example of system 500, blocks 1115 and 1120 could be repeated until the packet reaches the IOMC 257. At this point, the data packet control component 540 could determine that the receipt of the management packet serves as an acknowledgement that the load/store operations were successfully executed at the destination switch module (block 1125), and the method 1100 ends.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-readable storage device containing computer-readable program code that, when executed, performs an operation for transmitting a packet from a source switch module to a destination switch module, the operation comprising:
    receiving, at a first port of a first switch module of a distributed switch, a first packet that conforms to a first communications protocol and that includes: (i) path information specifying a route to the destination switch module and (ii) a set of load/store operations to be executed by the destination switch module in order to initialize communication links on the destination switch module, in order to in turn enable communications within the distributed switch according to a second communications protocol different from the first communications protocol;
    inserting an indication of the first port into a return path information portion of the first packet;
    upon determining that the first switch module is not the destination switch module, transmitting the first packet to a second switch module using a second port, the second port specified in the path information of the first packet, wherein the destination switch module is configured to, upon receiving the first packet, copy the set of load/store operations into an execution buffer to be automatically executed; and
    subsequent to communication links on the destination module being initialized, transmitting, from the first switch module and to the second switch module, a second packet that conforms to the second communications protocol.

2. The computer-readable storage device of claim 1, wherein the path information comprises an ordered listing of switch-to-switch link identifiers, and wherein each of the switch-to-switch link identifiers within the ordered listing of switch-to-switch link identifiers corresponds to a respective hop along the path from the source switch module to the destination switch module.

3. The computer-readable storage device of claim 1, wherein the packet is transmitted over an Ethernet communications link, and wherein the packet does not conform to any Open Systems Interconnection (OSI) communications protocol but instead conforms to a non-OSI communications protocol.

4. The computer-readable storage device of claim 1, wherein the inserted indication comprises an switch-to-switch link identifier corresponding to the first port of the first switch module.

5. The computer-readable storage device of claim 2, wherein the packet further includes a hop counter value, configured to be incremented at each hop along the path from the source switch module to the destination switch module.

6. The computer-readable storage device of claim 4, the operation further comprising:
    upon inserting the indication of the first port into the return path information portion of the first packet, incrementing a return hop counter value within the data packet.

7. The computer-readable storage device of claim 5, the operation further comprising:
    determining the first port by selecting one of the switch-to-switch link identifiers from the ordered listing of link identifiers, using the hop counter value as an index.

8. The computer-readable storage device of claim 7, the operation further comprising:
    incrementing the hop counter value within the packet, before transmitting the packet to the second switch module.

9. A system for transmitting a packet from a source switch module to a destination switch module, the system comprising:
    a processor; and
    a memory containing a program that, when executed by the processor, performs an operation comprising:
        receiving, at a first port of a first switch module of a distributed switch, a first packet that conforms to a first communications protocol and that includes: (i) path information specifying a route to the destination switch module and (ii) a set of load/store operations to be executed by the destination switch module in order to initialize communication links on the destination switch module, in order to in turn enable communications within the distributed switch according to a second communications protocol different from the first communications protocol;
        inserting an indication of the first port into a return path information portion of the first packet;
        upon determining that the first switch module is not the destination switch module, transmitting the first packet to a second switch module using a second port, the second port specified in the path information of the first packet, wherein the destination switch module is configured to, upon receiving the first packet, copy the set of load/store operations into an execution buffer to be automatically executed; and
        subsequent to communication links on the destination module being initialized, transmitting, from the first switch module and to the second switch module, a second packet that conforms to the second communications protocol.

10. The system of claim 9, wherein the path information comprises an ordered listing of switch-to-switch link identifiers, and wherein each of the switch-to-switch link identifiers within the ordered listing of switch-to-switch link identifiers corresponds to a respective hop along the path from the source switch module to the destination switch module.

11. The system of claim 9, wherein the packet is transmitted over an Ethernet communications link, and wherein the packet does not conform to any Open Systems Interconnection (OSI) communications protocol but instead conforms to a non-OSI communications protocol.

12. The system of claim 9, wherein the inserted indication comprises an switch-to-switch link identifier corresponding to the first port of the first switch module.

13. The system of claim 9,
wherein the first packet does not conform to the second communications protocol, wherein the second packet does not conform to the first communications protocol, wherein the second communications protocol comprises an Open Systems Interconnection (OSI) communications protocol, wherein the first communications protocol comprises a non-OSI communications protocol, wherein the communication links comprise Ethernet communication links, wherein the communications comprise OSI-model communications.

14. The system of claim 10, wherein the packet further includes a hop counter value, configured to be incremented at each hop along the path from the source switch module to the destination switch module.

15. The system of claim 12, the operation further comprising:
upon inserting the indication of the first port into the return path information portion of the first packet, incrementing a return hop counter value within the data packet.

16. The system of claim 13,
wherein the first packet is transmitted in a distributed switch and prior to OSI-model communications being operational in the distributed switch, wherein the distributed switch includes the first and second switch modules, wherein execution of the load/store operations renders OSI-model communications operational in the distributed switch, whereafter the second packet is transmitted based on the OSI communications protocol and exclusive of the non-OSI communications protocol.

17. The system of claim 14, the operation further comprising:
determining the first port by selecting one of the switch-to-switch link identifiers from the ordered listing of link identifiers, using the hop counter value as an index.

18. The system of claim 16, wherein the path information comprises an ordered listing of switch-to-switch link identifiers, wherein each of the switch-to-switch link identifiers within the ordered listing of switch-to-switch link identifiers corresponds to a respective hop along the path from the source switch module to the destination switch module;
wherein the packet further includes a hop counter value, configured to be incremented at each hop along the path from the source switch module to the destination switch module.

19. The system of claim 17, the operation further comprising:
incrementing the hop counter value within the packet, before transmitting the packet to the second switch module.

20. The system of claim 18, wherein the packet is transmitted over an Ethernet communications link, wherein the operation further comprises:
determining the first port by selecting one of the switch-to-switch link identifiers from the ordered listing of link identifiers, using the hop counter value as an index; and
incrementing the hop counter value within the packet, before transmitting the packet to the second switch module.

21. The system of claim 20, wherein the inserted indication comprises an switch-to-switch link identifier corresponding to the first port of the first switch module, wherein the operation further comprises:
upon inserting the indication of the first port into the return path information portion of the first packet, incrementing the return hop counter value within the data packet.

22. The system of claim 21, wherein the operation further comprises:
receiving, at the first port of the first switch module, return path information specifying a route from the destination switch module to the source switch module;
upon determining that the first switch module is the destination switch module, copying the set of load/store operations from the first packet into an execution buffer for automatic execution; and
once the set of load/store operations are executed, transmitting the packet to a second switch module using the first port on which the packet was received.

23. The system of claim 22, wherein the destination switch module is configured to monitor the execution buffer and further configured to, upon determining that the execution buffer contains one or more load/store operations, execute the one or more load/store operations;
wherein the destination switch module includes one or more registers, wherein the set of load/store operations specifies at least one of: (i) a value to be loaded into at least one of the registers and (ii) a value from at least one of the registers to be stored in a memory of the switch module;
wherein the destination switch module further includes or more ports, wherein each of the one or more ports is associated with a respective register indicative of whether the port is enabled or disabled, wherein the set of load/store operations is configured to write values to the one or more registers in order to disable all of the one or more ports.

24. The system of claim 23, wherein the packet is created based at least a portion of the path information and the set of load/store operations, wherein the packet is transmitted to the first switch module using the first port, wherein the first port is specified in the path information, wherein the first switch module is configured to transmit the packet based on at least the portion of the path information in the packet;
wherein an acknowledgement message is received from the destination switch module, the acknowledgement message indicating that the set of load/store operations have been executed successfully, wherein the acknowledgement message comprises a third packet.

* * * * *